May 7, 1957 A. P. BLOXSOM ET AL 2,791,657
COMBINATION SAFETY SWITCH AND FLOW METER
Filed Oct. 1, 1952 2 Sheets-Sheet 1
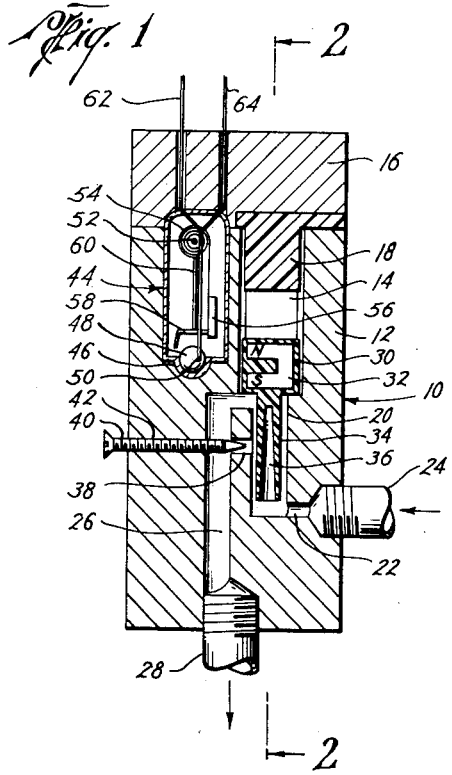
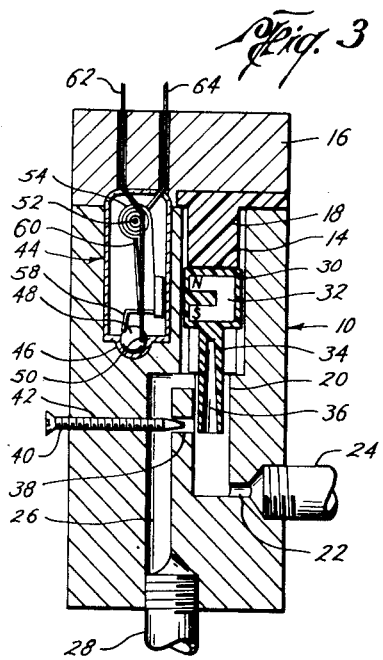
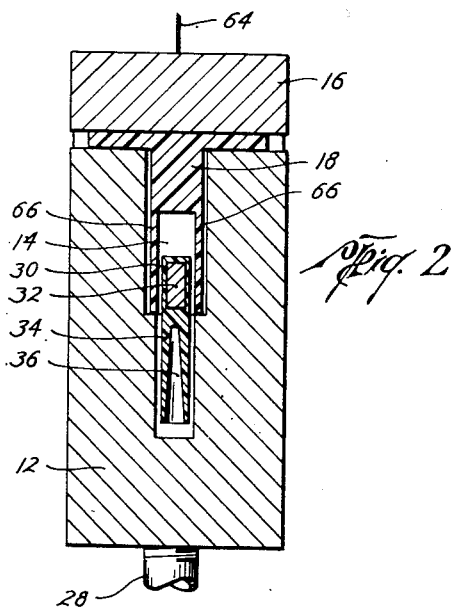
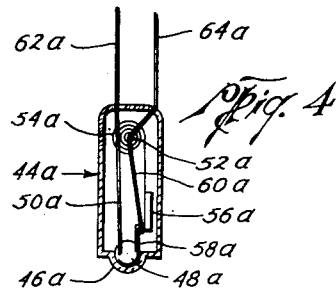
Allan P. Bloxsom
Dan E. Bloxsom
INVENTORS
BY James F. Weiler
ATTORNEY May 7, 1957   A. P. BLOXSOM ET AL   2,791,657
COMBINATION SAFETY SWITCH AND FLOW METER
Filed Oct. 1, 1952   2 Sheets-Sheet 2
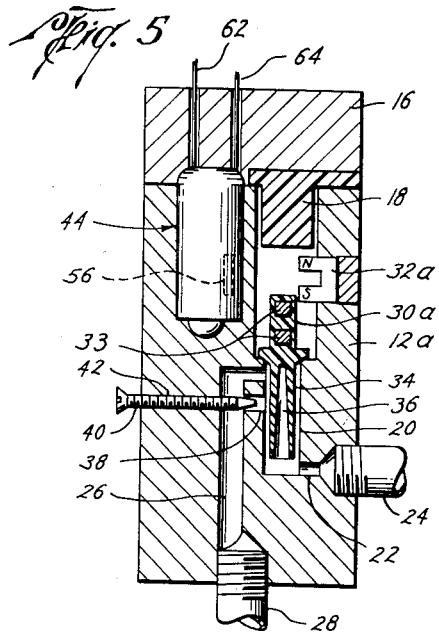
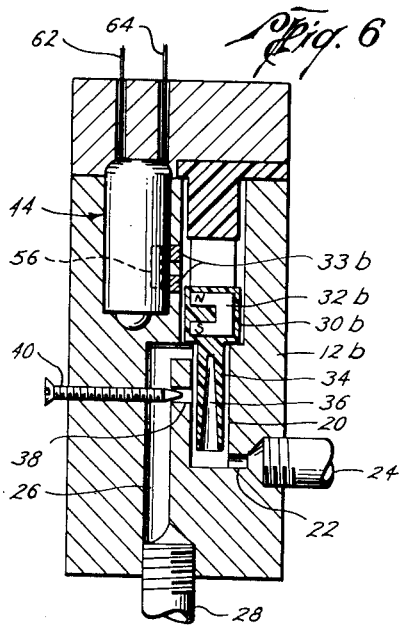
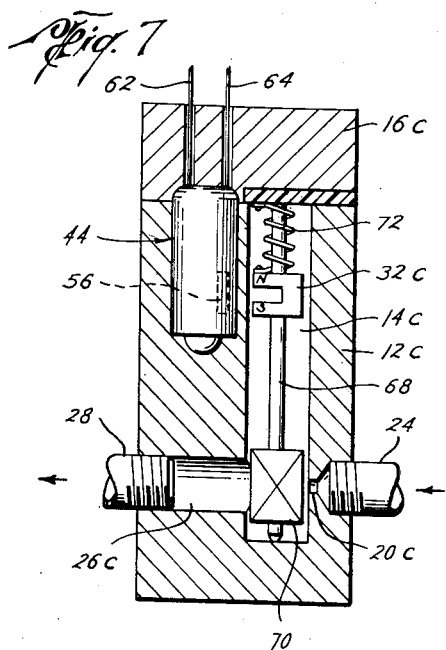
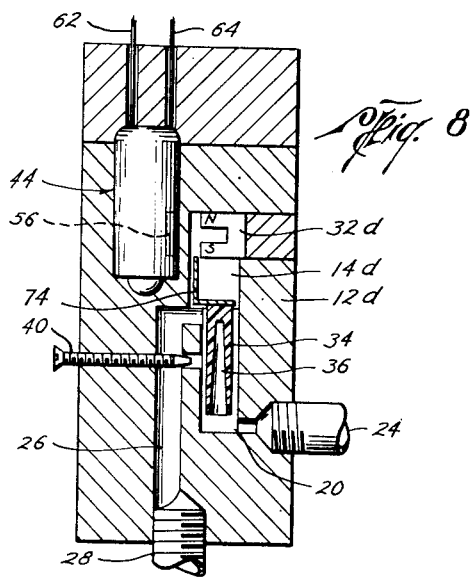
Allan P. Bloxsom
Dan E. Bloxsom
INVENTORS
BY *James F. Weiler*
ATTORNEY United States Patent Office 2,791,657
Patented May 7, 1957

2,791,657

COMBINATION SAFETY SWITCH AND FLOW METER

Allan P. Bloxsom and Dan E. Bloxsom, Houston, Tex.

Application October 1, 1952, Serial No. 312,496

9 Claims. (Cl. 200—81.9)

The present invention relates to measuring instruments and relates particularly to flow meters and to automatic alarms for interposition in flow lines.

The present invention is an improvement over our co-pending application, Serial No. 257,618, filed November 21, 1951, for a Combination Safety Switch and Flow Meter, in that the electrical contact structure is wholly separated from the passages or chamber through which the fluid to be metered flows thereby eliminating any possibility of oxidation of electrical elements and combustion of combustible fluids.

It is therefore a general object of the present invention to provide a simple, inexpensive, sensitive and dependable flow meter and alarm for interposition in flow lines in which the electrical contact structure is completely separated from the fluid passages or chambers.

A further object of the present invention is the provision of such a flow meter and alarm which is extremely accurate and gives accurate and dependable results irrespective of pressure conditions.

Yet a further object of the present invention is the provision of such a flow meter and alarm to make or break an electrical circuit in order to sound an alarm or actuate safety means when the rate of flow varies from a predetermined amount.

Still a further object of the present invention is the provision of such a signaling mechanism which will automatically respond when the flow through the instrument varies from a predetermined rate.

Yet a further object of the present invention is the provision of such a signaling device in which electrical elements are not exposed to flow of combustible fluids thereby avoiding any tendency of such elements to oxidize to such a state that combustion of the fluids may be avoided.

Yet a further object of the present invention is the provision of a flow meter and alarm of the character described in which the switch means includes a movable make and break member which is actuated by a horse shoe magnet.

Other and further objects will be apparent from the following description of examples of the invention, given for the purpose of disclosure, in connection with the accompanying drawings, where like reference numerals designate like parts throughout the several views, and where Fig. 1 is an elevation, in section, of a safety switch constructed in accordance with the invention, and shown in open position, Fig. 2 is a section taken along the line 2—2 of Fig. 1, Fig. 3 is similar to Fig. 1 but illustrates the safety switch in closed position, Fig. 4 is a sectional elevation of a suitable electric switch, shown normally in closed position, and Figs. 5–8 are elevations, in section, illustrating modifications constructed in accordance with the invention.

Referring now to the drawings, and particularly to Figs. 1–3 inclusive, the reference numeral 10 indicates generally the safety switch which includes the body 12 which may be of any convenient shape, here shown as cylindrical, when viewed in cross-section, and may be formed of any suitable material.

The body 12 has a centrally disposed flow chamber 14 which is closed at its upper end by the cap member 16 which is threadedly or otherwise secured to the body 12. The cap member 16 may have the depending and downwardly extending stop member 18 extending into the upper portion of the flow chamber 14 for a purpose which will be apparent later.

The flow chamber 14 may be of any convenient shape, but is here illustrated as being cylindrical and has the counterbored inlet passage 20 extending downwardly therefrom and establishing communication with the inlet 22 to which the inlet conduit 24 may be threaded or otherwise secured.

An outlet passage 26 is in communication with the chamber 14, to which may be threaded or otherwise secured the outlet conduit 28. Thus, fluid flowing through the device enters through conduit 24, and flows through the inlet passage 20, the flow chamber 14, out the outlet passage 26 and the outlet conduit 28.

A float or cap 30 is provided in the flow chamber 14 which seats on the upper end of the inlet passage 20 when the rate of flow through the switch falls below a predetermined level, as best seen in Fig. 1. Disposed in the cap member 30 is the horse shoe magnet 32 and depending from the cap 30 is the reduced portion or stem 34 which is bored at 36 to provide greater sensitivity to the movement of the float. It is understood that while a cap member 30 is illustrated, the magnet 32 may be seated directly upon the upper end of the passage 20 and have the depending portion 36 extending therefrom. It has been found satisfactory, however, to provide a coating of plastic material about the horse shoe magnet 32. Thus, the flow of fluid through the device, depending upon the rate of flow, will elevate the horse shoe magnet 32, and the degree of elevation with respect to the rate of flow may be controlled by means of a by-pass passage 38 extending between the inlet passage 20 and the outlet passage 26 and a threaded valve-like member 40 threaded in the bore 42 of the body 12. Thus, for greatly varying rates of flow, by manipulation of the threaded valve member 40, varying amounts of fluid may be by-passed to control the elevation of the horse shoe magnet 32.

Disposed in the body 12 and proximate the chamber 14 is a sealed mercury switch, indicated generally by the reference numeral 44, which is provided with a small well 46 containing a globule of mercury 48.

A fixed electrode 50 extends downwardly from the top of the switch 44 and into the mercury globule 48.

An arm 52 is mounted in the upper end of the switch 44 and supports a spiral hair spring 54, the other end of which extends downwardly and terminates in a plate or flag 56 formed of material which is sensitive to magnetism, such as iron and the like. Extending generally horizontally from the lower edge of the flag 56, is a wire 58, the other end of which terminates in a generally vertically electrode. The horizontal wire 58 is supported intermediate its ends by a looped rod 60 which depends from the arm 52.

As illustrated in Fig. 1, in its normal position, the switch 44 is open; the movable electrode 58 being positioned away from the mercury globule 48. When sufficient magnetic attraction is brought to bear upon the right-hand side of the flag 56, however, the flag will be attracted to the right and move the electrode 58 into bridging contact with the mercury globule 48 against the tension of the spring 54. Thus, the electric circuit is closed. The upper end of the fixed electrode 50 and the upper end of the arm 52 (which is an electrical connection with the movable electrode 48 through the spring 54, the flag 56 and the wire 58) pass through the wall of the switch 44 and are connected to the electrical conductors 62 and 64 respectively, which, in turn are connected with any suitable electric circuit having any suitable audible and/or visual alarm (not shown).

The sealed mercury switch 44 is of conventional design, may be purchased, and is illustrated in Patent No. 2,419,942, issued to Brewer on May 6, 1947.

Fig. 4 illustrates a sealed mercury switch 44a which is normally in closed or bridging position, and when sufficient magnetism is provided proximate the right-hand side of the flag 56a, the switch will be held in open position. Other than this change, the parts are similar to that described in connection with the sealed switch 44 of Fig. 1 and, it is understood that any conventional mercury switch which is operable by magnetism may be used, and depending upon the desired use, the switch may normally be in either open or closed position.

In order that the magnet 32 will be directed in the proper direction with respect to the flag 56, so that the field of magnetic flux will extend to and attract the flag 56, a pair of guides 66 which may depend from the stop member 18 are provided in the chamber 14. Thus, when the magnet 32 is elevated to its uppermost position it will be proximate the flag 56 and its magnet field will be directed at the flag 56.

In operation fluid enters by means of the conduit 24 into the inlet passage 20 and, depending upon the rate of flow and adjustment of the valve arrangement 40, will move the float 30 upward and flow out the outlet passage 26 and the outlet conduit 28. When the flow of fluid is above a predetermined rate the float 30 will be moved upwardly until the magnet 32 is adjacent the right-hand side of the flag 56 of the sealed mercury switch 44, in which event the flag 56 will be attracted to the right and move the depending electrode 58 into the globule of mercury 48 thereby closing an electric circuit. Thus, any suitable alarm connected to the electrical conductors 62 and 64 will be energized. If desired, a valve arrangement or control means may be provided in the electric circuit which automatically regulates the rate of flow, thereby permitting the magnet 32 to drop in the chamber 14 and the tension in the spring 54 to move the depending electrode 58 clear of the globule of mercury 48 thereby opening the circuit. The stop member 18, of course, prevents the magnet from rising above the flag 56 and with the guides 66 insures that the magnet 32 will be in a position whereby its field of magnetic flux is directed toward and attracts the flag 56.

A modification is illustrated in Fig. 5 in which the magnet 32a is fixed in the housing 12 adjacent the right-hand side of the flag 56 of the sealed mercury switch 44. Embedded in the cap 30a are a pair of poles 33 which are formed of a material which is a conductor of magnetic flux, such as iron. The magnet 32a is spaced far enough from the flag 36 that its field of magnetic flux is normally not strong enough to move the flag 56 to the right and thereby open or close the circuit, as desired. When the rate of flow through this embodiment becomes above a predetermined amount, the cap member 30a will be moved upwardly until the poles 33 are adjacent the magnet 32a, in which event, the poles 33 become magnets by induction, and thereby bring the magnetic field in close proximity to the flag 56, thereby overcoming the tension in the spiral spring 54 and moving the flag 56 to the right, thereby opening or closing the circuit as desired. Other than this change, the embodiment of Fig. 5 is similar to that of Fig. 1, and no further description thereof is deemed necessary.

The modification of Fig. 6 is similar to that of Fig. 5 except that the poles 33b are fixed in the housing 12 proximate the right-hand side of the flag 56 of the sealed mercury switch 44, and the magnet 32b is positioned in the cap member 30b, as is the case in the embodiment of Figs. 1–3. Thus, upward movement of the cap 30b will in turn move the magnet 32b upwardly and bring its field of magnetic flux in close proximity to the poles 33b, which thereby become induced magnetic poles, and extend the magnetic field to and thereby attract the flag 56 thereby overcoming the tension in the spring 54 and either open or close the circuit, as desired. Other than this change, the embodiment of Fig. 6 is similar to that of Figs. 1–3 and 5.

A still further modification and embodiment of the invention is illustrated in Fig. 7 in which a spindle 68 is pivotally secured in the chamber 14c, to the lower end of which is secured the vanes 70. The vanes 70 are positioned directly in the path of the flow of fluid in the inlet passage 20c and the outlet passage 26c. The magnet 32c is positioned on the spindle 68 proximate the flag 56 and a torsion spring 72 is connected to the cap 16c and the magnet 32c. The parts are so arranged that when no fluid is flowing through the device the torsion spring will maintain the magnet 32c at substantially right angles to the flag 56, thereby directing its field of magnetic flux in a direction away from the flag, the tension in the spring 54 preventing any movement of the flag 56 to the right. The tension in the torsion spring 72 may be predetermined or adjusted as desired, and as fluid flows in the inlet 24, the inlet passage 20c past the vanes 70, out the outlet passage 26c and outlet conduit 28, the flow of fluid will tend to rotate the vane against the force of the torsion spring 72. When the rate of flow reaches a predetermined amount, the forces will be such to rotate the spindle 68 and the magnet 32 to the position illustrated in Fig. 7, in which position the magnetic field of the magnet 32c is directed toward the flag 56 which will then be in the field of magnetic flux of the magnet 32c and be attracted to the right, thereby opening or closing the sealed mercury switch, as desired. Other than this change, the other parts and elements are similar to the example of the invention illustrated in Figs. 1–3.

Referring to Fig. 8, a still further embodiment of the invention is illustrated in which the magnet 32d is fixed in the chamber 14d but closely adjacent to the right-hand side of the flag 56 so that the flag 56 is normally attracted to the right by the magnet. A shield of magnetic material 74 is provided at the top of the float stem 34 and when the rate of flow through the meter is above a predetermined amount, the shield 74 will be moved upwardly thereby short-circuiting the magnetic field and thereby shielding the flag 56 from the attraction thereof thereby permitting the tension in the spring 54 to move the flag 56 to the left thereby closing or opening the circuit, as desired. Other than this change, this embodiment is similar to that illustrated in Fig. 5.

It is noted generally that the plunger 34 fits loosely in the passage 20, and the drilled or recessed portion 36 and lower surface of the float or magnet or shield, as the case may be, provide a lifting surface for moving the float upwardly. The spacing of the plunger 34 from the walls of the tube 20 and the spacing of the float 30 in the float chamber 14, the adjustment of the valve member 40, and the like are all variable factors which may be determined in advance to provide opening or closing of the switch 44 at desired rates of flow.

It will be understood that suitable indicia may be provided on the plunger or float and the body or on the vane and body to indicate rates of flow, in which event the body may be made of a transparent material, such as plexiglas, in order that the position of the plunger or float or vane may be read on a scale thereby indicating the rate of flow.

It is understood that various changes in the details of construction and arrangement of parts may be made. It is further understood that any conventional switch means having a movable contact or make and break member sensitive to magnetism may be used. In addition, it will be further understood that the switch and means to indicate the rate of flow may be used together and the means to indicate the rate of flow may be omitted, if desired.

The present invention, therefore, may be embodied in other specific forms without departing from the spirit or essential attributes thereof, and it is therefore desired that the present embodiments be considered in all respects as illustrative and not restrictive and given only for the purpose of disclosure, reference being had to the appended claims to indicate the scope of the invention.

What is claimed is:

1. A fluid-actuated electric switch for interposition in a flow line comprising, a body including a generally vertically-disposed chamber closed at one end, inlet and outlet means spaced from the closed end of the chamber establishing fluid communication of the flow line with the chamber, switch means including a magnetically-actuated make and break element disposed in the body adjacent to the closed end but spaced from said chamber, a member movable in the chamber in response to fluid flow therein, and a horseshoe magnet in the chamber proximate the closed end and interiorly of the inlet and outlet means arranged with the member whereby movement of the member brings the magnetic field of the horseshoe magnet into and out of actuating position thereby actuating the make and break element.

2. The fluid actuated electric switch of claim 1 in which the member in the chamber responsive to fluid flow therethrough comprises a float by which the magnet is carried, movement of the float moving the magnet to and away from said magnetically actuated make and break element for actuating said make and break element.

3. The fluid actuated electric switch of claim 1 where the magnet is fixed in the body proximate the chamber and the make and break element, such magnet alone being incapable to actuate such making and break element, said member in the chamber comprising a float responsive to said fluid flow therethrough, and a pair of magnetic sensitive poles carried by said float, movement of said float aligning said poles with such magnet thereby magnetizing such poles and extending the magnetic field of the magnet to and being capable of actuating said make and break element.

4. The fluid actuated electric switch of claim 1 where the member in the chamber responsive to fluid flow therein comprises a float by which the magnet is carried, movement of the float carrying the magnet to and away from said make and break element, said magnet alone being incapable of actuating said make and break element, and a pair of magnetizable poles disposed in said body adjacent said chamber and said make and break element, movement of said float aligning said magnet with such poles thereby magnetizing such poles and extending the magnetic field of the magnet to and being capable of actuating said make and break element.

5. The fluid actuated electric switch of claim 1 where the member in the chamber responsive to the fluid flow therein comprises a float, a magnetic shield carried by the float, and where the magnet is fixed in the body so that such make and break element is normally actuated by said magnet, said shield being movable in the path of the magnetic field of said magnet thereby preventing actuation by said magnet of such make and break element.

6. The fluid actuated electric switch of claim 1 in which the member in the chamber responsive to fluid flow therein comprises a vane rotatably disposed in the chamber, and where the magnet is positioned in the chamber adjacent to but its magnetic field is at an angle to the make and break element, and a torsion spring connected to said body and said vane for normally maintaining said magnetic field at an angle to said make and break element but yieldable by flow of fluid of a predetermined rate for rotating said magnet to actuate said make and break element.

7. A fluid-actuated electric switch for interposition in a flow line comprising, a body including a vertical and generally cylindrical chamber closed at one end, inlet and outlet means spaced from the closed end of the chamber establishing fluid communication of the flow line with the chamber, bypass means extending between said inlet and outlet means, adjustable valve means regulating flow of fluid in said bypass means, switch means including a magnetically-actuated contact element disposed in said body adjacent to the closed end but spaced from the chamber, a member movable in the chamber in response to fluid flow therein, and a horseshoe magnet in the chamber proximate the closed end and interiorly of the inlet and outlet means arranged with the member whereby movement of said member by the fluid flow brings the magnetic field of the horseshoe magnet into and out of actuating position thereby actuating the make and break element.

8. A fluid-actuated electric switch for interposition in a flow line comprising, a body, a vertically-disposed and generally cylindrical chamber in the body, said chamber being closed at one end, inlet and outlet means spaced from the closed end of the chamber establishing fluid communication of the flow line with the chamber, bypass means extending from the inlet and outlet means for by-passing fluid around the chamber, adjustable valve means for regulating flow of the fluid through the bypass means, switch means including a magnetically-actuated movable contact member disposed in the body adjacent to but spaced from the closed end of the chamber, a float snugly fitting in the chamber responsive to flow of the fluid therein, a horseshoe magnet carried by the float, and guide means in the chamber for guiding said magnet so that on movement of said float the magnet is moved adjacent the switch means and the magnetic field of the magnet is directed at said contact member for actuating said contact member.

9. The switch of claim 1 in which the member movable in the passage chamber is a vertically guided float.

References Cited in the file of this patent

UNITED STATES PATENTS

| 1,396,121 | Jacobsen | Nov. 8, 1921 |
| 1,962,795 | Walker | June 12, 1934 |
| 2,062,674 | Pirwitz | Dec. 1, 1936 |
| 2,307,304 | Rudd | Jan. 5, 1943 |
| 2,419,942 | Brewer | May 6, 1947 |
| 2,503,089 | Binford | Apr. 4, 1950 |
| 2,523,666 | Moth | Sept. 26, 1950 |
| 2,529,688 | Grupp | Nov. 14, 1950 |
| 2,628,297 | Grauer | Feb. 10, 1953 |